United States Patent [19]

Andersen

[11] Patent Number: 5,112,272
[45] Date of Patent: May 12, 1992

[54] METHOD FOR PROVIDING A CUT AROUND THE ANUS OF AN ANIMAL, WHICH IS SUSPENDED FROM ITS BACK FEET, TO FREE THE RECTUM FROM THE CARCASS, AND APPARATUS FOR PERFORMING SAID METHOD

[75] Inventor: Børge C. Andersen, Værløse, Denmark

[73] Assignee: Nutridan Engineering A/S, Denmark

[21] Appl. No.: 585,063

[22] PCT Filed: Apr. 13, 1989

[86] PCT No.: PCT/DK89/00085
§ 371 Date: Oct. 22, 1990
§ 102(e) Date: Oct. 22, 1990

[87] PCT Pub. No.: WO89/10060
PCT Pub. Date: Nov. 2, 1989

[30] Foreign Application Priority Data

Apr. 22, 1988 [DK] Denmark .............................. 2190/88

[51] Int. Cl.⁵ .............................................. A22B 5/00
[52] U.S. Cl. .................................... 452/122; 452/120; 452/109
[58] Field of Search ................. 452/106, 120, 160, 189, 452/122, 117, 163, 109

[56] References Cited

U.S. PATENT DOCUMENTS

| | | | |
|---|---|---|---|
| 4,023,237 | 5/1977 | Meyn | 452/122 |
| 4,087,886 | 5/1978 | Aubert | 452/106 |
| 4,117,570 | 10/1978 | Meyn | 452/122 |
| 4,131,973 | 1/1979 | Verbakel | 452/117 |
| 4,486,920 | 12/1984 | Tieleman et al. | 452/109 |
| 4,564,977 | 1/1986 | Scheier et al. | 452/109 |
| 4,779,307 | 10/1988 | van der Hoorn et al. | 452/163 |

Primary Examiner—Willis Little
Attorney, Agent, or Firm—Ostrolenk, Faber, Gerb & Soffen

[57] ABSTRACT

Method for providing a cut around the anus of an animal, preferably a hog, to free the rectum from the carcass, which is suspended at its back feet, according to which method a rotating, tubular knife is advanced towards the anus of the animal for making a cut around it in a predetermined depth. With the purpose of obtaining an automatized cutting process to free the rectum of animals, which may vary as to size and also be individually different, the method is characteristic in that the carcass is fixed with respect to a vertical plane through the axis of the knife, that the hind part of the carcass is fixed with respect to a vertical plane perpendicular to the first plane, that a linear sensor parallel with the second plane is moved downwards in a substantially vertical direction in such a distance from the second plane that it hits the root of the animals tail, and that the rotating knife is adjusted to a predetermined position with respect to the sensor, when it is hitting the root of the tail, after which the sensor is moved to an inactive position out of the way of the knife, whereafter the cut is made.

18 Claims, 2 Drawing Sheets

METHOD FOR PROVIDING A CUT AROUND THE ANUS OF AN ANIMAL, WHICH IS SUSPENDED FROM ITS BACK FEET, TO FREE THE RECTUM FROM THE CARCASS, AND APPARATUS FOR PERFORMING SAID METHOD

BACKGROUND OF THE INVENTION

1. Field of the Invention

The present invention relates to a method for providing a cut around the anus of an animal to free the rectum from a carcass suspended from both its back feet. Furthermore, the invention relates to an apparatus for carrying out said method.

On slaughter lines the carcasses of the animals are normally conveyed along the line suspended from their back feet. Animal slaughter lines have been established with many partially automatized functions. After scalding and removal of the outer layer of skin by means of hair shoving, black-singing and scraping, the animals are opened. One of the first stages of the opening is to free the rectum at the anus. The rectum is connected to the skin and should be cut free in such a way that it is not damaged. For this purpose a cut is performed by means of a knife around the rectum.

2. Description of the Related Art

On slaughter lines this cutting may take place manually, but as it is a very labor demanding operation, automatic devices for the operation have been proposed. A device of this kind is known from EP-A-258 939 and comprises a positioning element to be inserted into the anus by a movement in the lengthwise direction of the positioning element. The cutting operation is performed by a cutting element disposed concentrically around the positioning element and displaceable in the direction of its axis of rotation. In the known apparatus, the carcass is supported during the advancing of the positioning element by means of a supporting bracket with a fork acting as a fixation for the carcass during the cutting operation. The known device has no means for adjusting the position of the positioning element for adjust to individual differences of the carcasses. This will exclude a totally automatic operation of the device.

SUMMARY OF THE INVENTION

The object of the invention is to provide a method, by means of which cutting free of the rectum can be automated.

The invention is based on the observation that when carcasses are suspended from both their back feet, the distance in vertical direction between the root of the animal's tail and the anus is subject to only small variations. These variations are so small that the knife may be adjusted to its cutting position on the basis of measurement of the position of the root of the tail. The carcass is then advanced axially on the condition that the animal before and after the measurement is fixed such that the root of the tail may be hit by a simple movement of the sensor. To meet this requirement, the animal is fixed by means of a fixation means pressing against its back in the hind part of the animal. Preferably, the knife is provided with a gauge, which during the cutting process is introduced into the anus. The guage prevents improper positioning of a cut in an abnormally dimensioned animal. The gauge is also used for activating the preparation for a new carcass, whereby the adjustment of the knife is changed slightly before the new operation is started. If the operation fails, an alarm to set off, and the operation may then be carried out manually.

When the rectum has been cut free, the position of the animal and the opening made by the cutting may be used for the introduction of a knife with a ball-point and for dividing the crutch of the animal. As a result, more labor-consuming and awkward working process is avoided.

BRIEF DESCRIPTION OF THE DRAWINGS

The invention will be described in detail with reference to the accompanying drawing, in which.

DETAILED DESCRIPTION OF A PREFERRED EMBODIMENT

Figure 1:
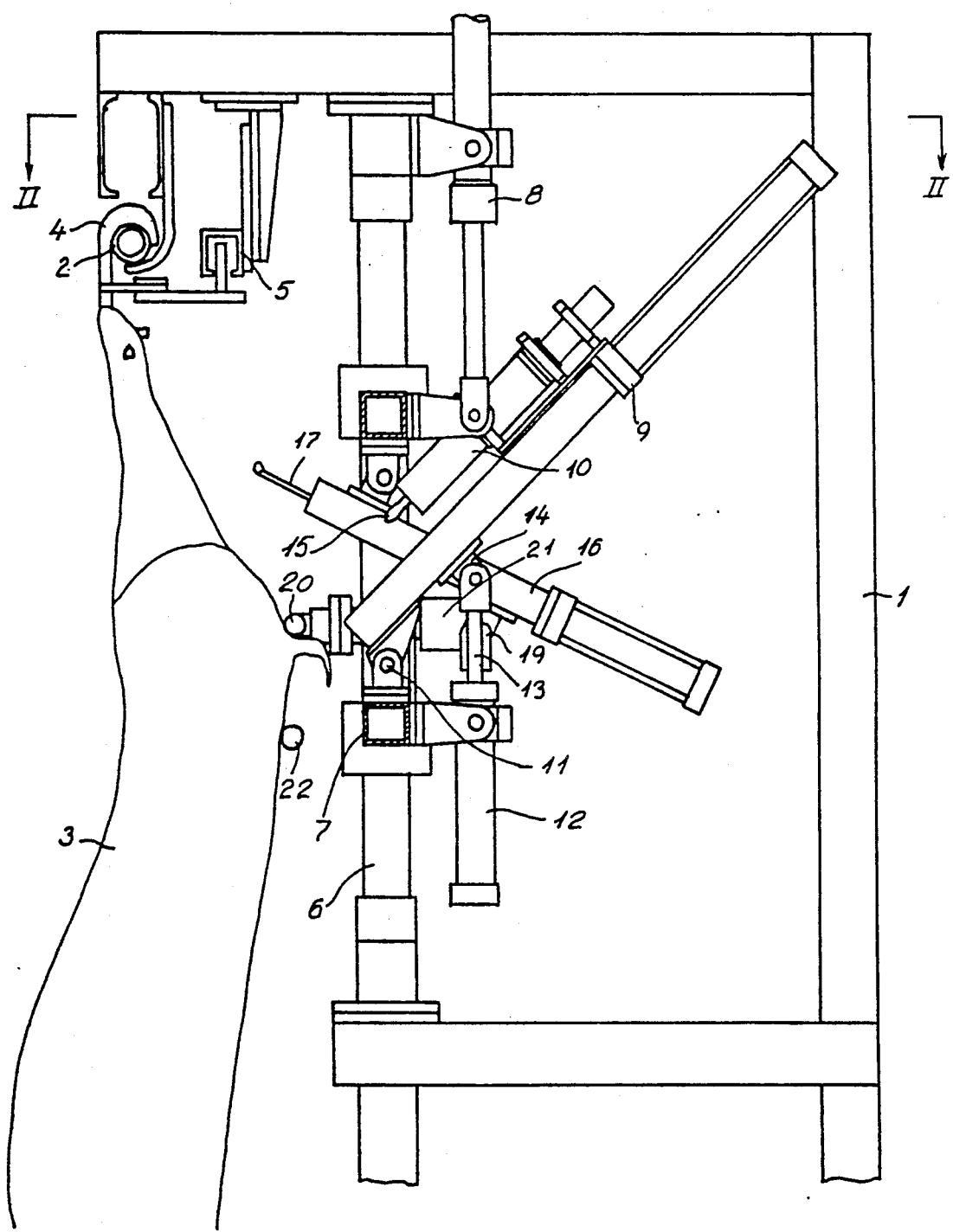
FIG. 1 shows a section through an embodiment of the apparatus according to the invention and through the conveying means on a slaughter line.

The embodiment shown in the drawing of an apparatus for providing a cut around the anus of a carcass for freeing the rectum comprises a supporting frame 1 connected with a support rail 2 for supporting carcasses, which are suspended from their back feet by means of hooks 4 arranged in pairs. The support rail 2 may run through the major part of a slaughter line. The hooks 4 are mounted a predetermined distance from one another by a fixation means in each pair of hooks. Advancing means 5 are adapted to advance the carcasses along the support rail 2 and for fixing the animals for as long as required at each working station.

Figure 2:
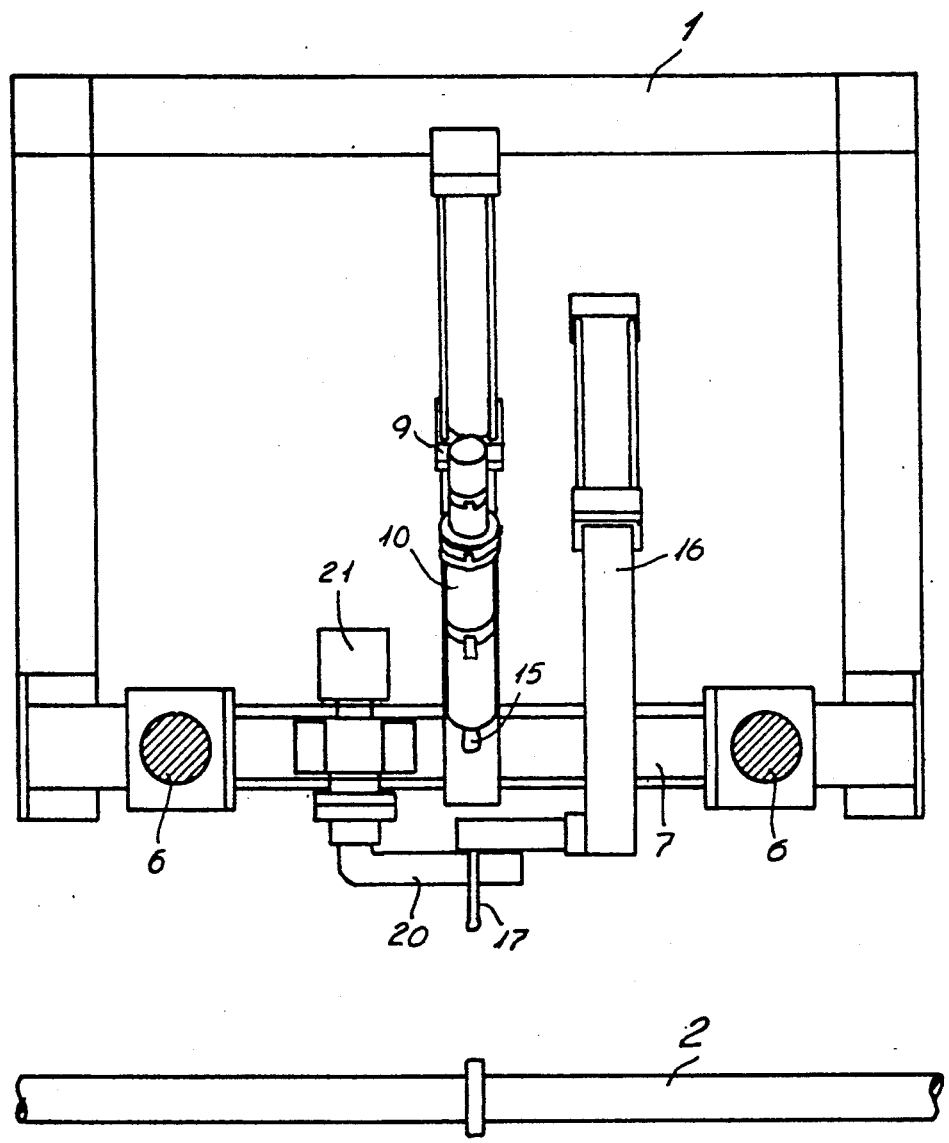
FIG. 2 shows a section through the apparatus along the line II—II according to FIG. 1.

The main support frame 1 comprises a pair of vertical positioning columns 6, along which a second frame 7 is displaceable in a vertical direction. The second frame 7 is displaced by means of a hydraulic cylinder 8 or corresponding driving means connected to the upper part of the main support frame. A positioning means 9 for a rotating knife 10 provided with a driving means is pivotally mounted on the second frame 7. The positioning means is pivotal in a vertical direction around a swinging shaft 11 by means of a hydraulic cylinder 12. The piston 13 of the hydraulic cylinder 12 is connected to a console 14 on the positioning means 9. By means of the hydraulic cylinder it is possible to change the angle of the longitudinal axis of the rotating knife from approx. 45° as shown in the drawing to approx. 60° with the horizontal plane. The rotating knife 10 comprises a centrally placed gauge 15 protruding somewhat in relation to the edge of the knife. An advancing means 16 for a knife 17 with a ball-shaped point is pivotally connected to the second frame 7. The angle of the advancing means 16 is adjustable by means of a hydraulic cylinder, which is not visible in FIG. 1 on account of the cylinder 12, and the piston of which is in gear with a console 19 placed on the advancing means 16. From FIG. 2 it can be seen how the two advancing means are mounted side by side on the second frame 7.

A sensor arm 20, mounted on the second frame, is arranged for adjusting the height of the second frame. The sensor arm is pivotal around a horizontal axis by means of a driving means 21, enabling an active horizontal position shown in the drawing and an inactive, vertical position. The sensor arm is provided with a contact sensor, emitting a signal for the activation of the cutting operation.

In the lower part of the animal's body, fixation means 22 presses against the back of the carcass.

An automatic free-cutting of the rectum of the carcass can be carried out while using the method according to the invention. At the end of a working operation the apparatus is positioned in its uppermost position, in which the piston of the cylinder 8 is withdrawn into the cylinder. By means of the advancing means 5, a carcass 3 is placed and fixed in front of the apparatus. During the fixation, depending on the size and shape of the animal the carcass is pushed slightly away from the apparatus by means of the fixation means 22 so that the carcass rests against the fixation means. On account of this, the hind of the carcass will be fixed in such a way that the tail of the carcass will be positioned in a certain vertical plane in front of the apparatus. This occurs with narrow limits, irregardless of the size of the animal. Then the second frame 7 is lowered until the sensor arm 20, which has taken up a horizontal position, contacts the root of the animal's tail. The contact activates the contact sensor, which starts the cutting operation. At first the sensor arm is pivoted into a vertical position, then the rotating knife is advanced towards the animal until the gauge 15 penetrates about 20 mm into the anus of the animal. The hollow space in the inside of the knife is then connected to a vacuum source in order to suck up any content from the rectum, which may get out during the subsequent cutting. The knife is tilted to a position, in which it is at an angle of 60° to relative to the horizontal plane during the further advancing of the knife 10. When a predetermined cutting depth has been reached, the rectum is cut free and the rotating knife can be withdrawn. The rotating knife comprises disinfecting means, which are activated after each cutting operation, preferably when no carcass is present in front of the apparatus. After the cutting operation, the rotating knife is brought back into the position in which it forms an angle of 45° relative to the horizontal plane.

The apparatus of the preferred embodiment is provided with a cutting device which divides the animal through the crutch. The cutting device comprises the advancing means 16 and is tilted into a position in which it forms an angle of approx. 45° relative to the horizontal plane. The knife 17 is brought forward into the cut in the animal. When the advancing means has returned to the position shown in the drawing, the knife 17 will divide the carcass through the crutch, after which the knife returns to its starting position. Finally, the support frame returns to its starting position, in which the sensor arm is lifted from the carcass, and the carcass is then conveyed further down the line by means of advancing means 5. A new operation is then initiated when a new carcass is brought into position in front of the apparatus.

I claim:

1. A method of automatically positioning and cutting an animal carcass for removal of its rectum, comprising the steps of:
   supporting the carcass;
   positioning the carcass such that its hind is fixed in a predetermined position;
   sensing the location of the root of the animal carcass tail;
   positioning a rotating cylindrical knife relative to the location of the root of the carcass tail;
   inserting a gauge into the animal carcass anus to a predetermined depth;
   advancing the knife to a cutting position; and
   cutting around the anus with the knife to the predetermined depth.

2. A method as recited in claim 1, wherein said sensing step comprises:
   moving a sensor arm to a sensing position;
   lowering the sensor arm until it contacts the root of the animal carcass tail; and
   retracting the sensor arm from the sensing position after said positioning of the rotating cylindrical knife.

3. A method as recited in claim 2, wherein said moving and retracting of said sensor arm into and out of said sensing position is performed by a pivoting motion.

4. A method as recited in claim 1, wherein said carcass is supported in a vertical plane.

5. A method as recited in claim 4, wherein the knife is advanced at an angle of 45° relative to the vertical plane.

6. A method as recited in claim 1, wherein said predetermined depth is about 20 mm.

7. A method as recited in claim 1, further comprising the step of connecting the knife to a vacuum source during cutting.

8. A method as recited in claim 4, wherein, during cutting, the knife is disposed at an angle of 60° relative to a horizontal plane perpendicular to the vertical plane.

9. A method as recited in claim 1, further comprising the steps of:
   moving a second knife into a hole resulting from the cutting step; and
   pivoting the second knife such that the carcass is split at its crutch.

10. An apparatus for automatically positioning and cutting an animal carcass for removal of its rectum, said apparatus comprising:
    means for supporting the carcass;
    means for positioning the carcass such that its hind is in a predetermined position;
    means for sensing the location of the root of the carcass tail;
    means for positioning a rotating cylindrical knife relative to the location of the root of the carcass tail;
    a gauge attached to said knife, said gauge being inserted into the carcass anus to a predetermined depth; and
    means for advancing said knife to said predetermined depth.

11. An apparatus according to claim 10, wherein said supporting means comprises:
    a frame adapted to support the carcass; and
    a suspension hook attached to said frame, said suspension hook suspending the carcass from its back feet.

12. An apparatus according to claim 10, further comprising:
    a first frame for supporting the carcass; and
    a second frame attached to said first frame, said second frame adapted for vertical displacement within said first frame relative to said carcass, wherein said second frame supports said sensing means, said cutting means, and said advancing means.

13. An apparatus according to claim 12, wherein said sensing means comprises a sensor arm pivotally attached to said second frame, said sensor arm being pivotal into and out of a sensing position.

14. An apparatus according to claim 10, wherein said gauge is arranged coaxially within said rotating cylindrical knife.

15. An apparatus according to claim 10, wherein said supporting means supports said carcass in a vertical plane.

16. An apparatus according to claim 15, wherein said advancing means is pivotally attached to said second frame, enabling said knife to be advanced at an angle between 45° and 60° with respect to a horizontal plane perpendicular to said vertical plane.

17. An apparatus according to claim 13, wherein said sensing arm comprises a rod having a contact sensor sensing contact with the root of the carcass tail, said contact sensor activating cutting of the carcass.

18. An apparatus according to claim 12, further comprising a second knife pivotally attached to said second frame for splitting the carcass at the crutch.

* * * * *